United States Patent [19]

Schermann et al.

[11] Patent Number: 5,470,383
[45] Date of Patent: Nov. 28, 1995

[54] THICKENER COMBINATIONS FOR BUILDING PRODUCTS

[75] Inventors: Walter Schermann, Mainz; Dennis Miller, Kelkheim; Eckhard Hilgenfeldt, Wiesbaden; Jozef Böhme-Kovac, Dexheim, all of Germany

[73] Assignee: Hoechst Aktiengesellschaft, Frankfurt, Germany

[21] Appl. No.: 263,089

[22] Filed: Jun. 21, 1994

[30] Foreign Application Priority Data

Jun. 23, 1993 [DE] Germany .......................... 43 20 508.9

[51] Int. Cl.[6] .............................. C08L 1/26; C08L 1/28; C09D 101/26; C09D 101/28
[52] U.S. Cl. .................... 106/170; 106/178; 106/186; 106/188; 106/197.1
[58] Field of Search ............................ 106/197.1, 170, 106/178, 186, 188

[56] References Cited

U.S. PATENT DOCUMENTS

| 4,784,693 | 11/1988 | Kirkland et al. | 106/93 |
| 4,892,589 | 1/1990 | Kirkland et al. | 106/197.1 |
| 5,140,099 | 8/1992 | Bostrom et al. | 536/91 |
| 5,279,313 | 1/1994 | Clausen et al. | 132/208 |

FOREIGN PATENT DOCUMENTS

| 13067/92 | 9/1992 | Australia . |
| 0314118 | 5/1989 | European Pat. Off. . |
| 0390240 | 10/1990 | European Pat. Off. . |
| 0504870 | 9/1992 | European Pat. Off. . |
| 3920025 | 1/1991 | Germany . |
| 92/03120 | 3/1992 | WIPO . |

OTHER PUBLICATIONS

Chemical Abstracts, vol. 88, No. 26, Jun. 26, 1978.
Chemical Abstracts, vol. 107, No. 18, Nov. 2, 1987.
Database WPI, Week 7937, 79–67105B Jan. 1978.

Primary Examiner—David Brunsman
Attorney, Agent, or Firm—Connolly & Hutz

[57] ABSTRACT

The invention relates to thickener combinations for building products of nonionic cellulose ethers soluble in water or aqueous surfactant solutions and selected surfactants or naphthalenesulfonic acid condensation products.

11 Claims, No Drawings

THICKENER COMBINATIONS FOR BUILDING PRODUCTS

Synergistic thickening effects of mixtures of water-soluble ionogenic and non-ionogenic polymers, for example hydroxyethylcelluloses and sodium carboxymethylcelluloses, are known. The thickening effect depends on the molecular weight of the cellulose ether, type of substituent, the respective degree of substitution and the amount used.

It is likewise known that macrosurfactants having altered theological behavior can be prepared by appropriate modification of a cellulose ether (Nonionic Polymer Surfactants, L. M. Landoll, Journal of Polymer Science: Polymer Chemistry Edition, Vol. 20, 443–455(1982), John Wiley & Sons, Inc. N.Y.).

Furthermore, there has been described an interaction between sodium dodecyl sulfate (SDS) and ethylhydroxyethylcellulose (EHEC) (I. Nahringbauer, Progr. Colloid Poly. Sci. 84, 200–205(1991)) or methylhydroxyethylcellulose (J.-E -Löfroth, L. Johansson, A.-C. Normann and K. Wettström, Prog. Colloid Poly. Sci. 84, 73–77(1992)).

It is furthermore known that partially hydrophobicized cellulose ethers can interact with conventional surfactants of relatively low molecular weight. They lead either to an increase or decrease in the viscosity. Specifically, interactions of partially hydrophobicized hydroxyethylcellulose (HM-HEC) with surfactants are published in the literature:

Increase in the viscosity on addition of anionic sodium oleate (R. A. Gelman and H.-G. Barth, Polymer. Mater. Sci., Eng. 51, 556–560, 1987)

Decrease in the viscosity on addition of nonionic octylphenol ethoxylate having 67% of EO (R. A. Gelman, Int. Dissolving Pulps Conf., Geneva 1987)

Increase in the viscosity on addition of anionic sodium dodecyl sulfate (SDS).

The influence of SDS is different from that found by Gelman with sodium oleate. With SDS, the effect reaches its maximum at the critical micelle formation concentration of the surfactant. At higher concentrations, it becomes increasingly weak. Sodium dodecyl sulfate (SDS) has no interaction with non-modified hydroxyethylcellulose (HEC) (R. Tanaka, J. Meadows, G. O. Phillips and P. A. Williams, Carbohydrate Polymers, 12, 443–459(1990)).

Furthermore, interactions of partially hydrophobicized hydroxyethylcellulose (HM-HEC) with anionic surfactants such as sodium hexanoate, sodium octanoate, sodium decanoate, sodium dodecanoate, sodium decyl sulfate and with nonionic surfactants of the alkyl poly(oxyethylene) ether type having a $C_{11}$, $C_{13}$ chain length and 8 EO units have been described (R. Tanaka, J. Meadows, P. A. Williams and G. O. Phillips, Macromolecules 1992, 25, 1304–1310). This new class of the non-ionogenic "hydrophobically modified" water-soluble cellulose derivatives having a low degree of hydrophobicization has likewise become of scientific interest with regard to qualitative modeling of the principle of action (E. D. Goddard, J. Coll. Int. Sci., Vol. 152, No. 2(1992), 578–581).

Likewise, the profuse patent literature mirrors the activities in the sector of partially hydrophobicized cellulose derivatives (DE.-A-3 004 161, EP-A-0 426 086, EP-A-0 384 167, EP-A-390 240).

There is a desire to effectively use, by a low-cost and simple method, improvements achievable by thickener combinations, for example in the processing rheology of building materials, and thereby to extend the conventional property profile of the original base thickener, i.e. the non-modified cellulose derivatives. Overall, the interactions of partially hydrophobicized hydroxyethylcellulose (HM-HEC) with surfactants are known, these being able to lead, as described above, to an increase or a decrease in the viscosity. The type of rheological effect depends, inter alia, on the concentration and the chemical structure of the surfactant added. Inter alia, influencing parameters of the building product also have to be taken into account. These influences cannot be theoretically predicted.

It has now surprisingly been found that thickener combinations of water-soluble, nonionic cellulose ethers and selected surfactants or naphthalenesulfonic acid condensation products enable the achievement of improvements relevant to the application in the processing properties of building products.

The invention provides thickener combinations for building products comprising at least one nonionic cellulose ether soluble in water or aqueous surfactant solutions (component I) and, as component II, a) at least one nonionic surfactant of the formula

in which
R is $C_8$–$C_{22}$-alkyl, preferably $C_{11}$–$C_{18}$-alkyl, $C_8$–$C_{22}$-alkenyl, preferably $C_{11}$–$C_{22}$-alkenyl, or $C_8$–$C_{12}$-alkaryl,
A is the group $OCH_2CH_2$ or $OCH(CH_3)CH_2$, and
n is a number from 1 to 8, preferably from 2 to 5, or b) at least one anionic surfactant comprising:

$b_1$) at least one ethersulfate, ethersulfonate, ethercarboxylate and/or isethionate of the formula

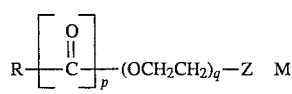

in which
R is $C_8$–$C_{22}$-alkyl, preferably $C_{11}$–$C_{18}$-alkyl, or $C_8$–$C_{22}$-alkenyl, preferably $C_{11}$–$C_{22}$-alkenyl, or $C_8$–$C_{12}$-alkaryl,
Z is a group of the formula $OSO_3^\ominus$, $SO_3^\ominus$ or $OCO_2^\ominus$,
M is an alkali metal ion or triethanolammonium ion,
P is either 0 or 1, and
q is a number from 1 to 5, preferably from 2 to 3, or $b_2$) at least one olefinsulfonate sodium salt, a primary or secondary alkanesulfonate or a primary or secondary alkylarylsulfonate, or $b_3$) at least one tauride and/or methyltauride of the formula

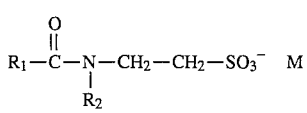

in which
$R_1$ is $C_8$–$C_{18}$-alkyl, preferably $C_{11}$–$C_{18}$-alkyl, or $C_8$–$C_{18}$-alkenyl, preferably $C_{11}$–$C_{18}$-alkenyl,
$R_2$ is hydrogen or methyl, and
M is an alkali metal ion or triethanolammonium ion, or c) at least one cationic surfactant of the formula

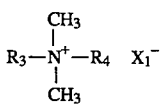

in which

R$_3$ is C$_8$–C$_{20}$-alkyl

R$_4$ is hydrogen, methyl, benzyl or C$_8$–C$_{20}$-alkyl

X$_1$ is a halide ion, acetate ion, lactate ion or methylsulfate ion or d) at least one naphthalenesulfonic acid/formaldehyde condensation product.

The cellulose ethers used as component I are usually nonionic cellulose ethers soluble to at least 1% by weight in water or aqueous surfactant solutions at 20° C. Such cellulose ethers preferably possess a methyl, hydroxyethyl, hydroxypropyl or ethylhydroxyethyl substitution, particularly preferably a hydroxyethyl or ethylhydroxyethyl substitution (cellulose ether substrate) and a further substitution by at least one hydrocarbon radical having from 8 to 36, preferably from 10 to 24, carbon atoms in an amount between 0.2% by weight and 5% by weight, based on the cellulose ether substrate. The cellulose ethers used as component I preferably possess an average molecular weight ($\overline{M}$hd w) of from 10,000 to 500,000.

Any nonionic, water-soluble methyl-, hydroxyethyl-, hydroxypropyl- or ethylhydroxyethylcellulose ether can be used as cellulose ether substrate for forming the cellulose ethers used according to the invention. Thus, for example, methylcellulose, hydroxyethylcellulose, hydroxypropylcellulose, ethylhydroxyethylcellulose, methylhydroxyethylcellulose and methylhydroxypropylcellulose can be modified. The amount of the abovementioned substituents seems to be non-critical, as long as enough is present to ensure that the cellulose ether is soluble in water or aqueous surfactant solutions.

The preferred cellulose ether substrate is hydroxyethylcellulose (HEC) or ethylhydroxyethylcellulose (EHEC). The abovementioned cellulose ether substrates are substituted by one or more hydrocarbon radicals having from 8 to 36 carbon atoms, preferably from 10 to 24 carbon atoms. This partial hydrophobicization is carried out to only that extent which gives continued solubility of the cellulose ethers used according to the invention in water or aqueous surfactant solutions. The hydrophobic substituents are usually used in an amount of between 0.2% by weight and 5% by weight, based on the cellulose ether substrate. Various reagents are suitable for the partial hydrophobicization. These include C$_8$–C$_{36}$-alkyl halides, C$_8$–C$_{36}$-alkylaryl halides, C$_8$–C$_{36}$-alkyl epoxides, C$_8$–C$_{36}$-alkylaryl glycidyl ethers and also C$_8$–C$_{36}$-alkyl glycidyl ethers.

Of the alkyl epoxides, preference is given to using compounds having a chain length of from 10 to 24 carbon atoms, particularly preferably compounds having the following carbon chain length: C$_{10}$, C$_{12}$, C$_{14}$ and C$_{20-24}$. The cellulose ethers partially hydrophobicized by alkyl epoxides include, in particular, the corresponding hydroxyethylcellulose ethers (HEC) as are described in DE-A-30 04 161. The alkylaryl glycidyl ethers used have the following formula:

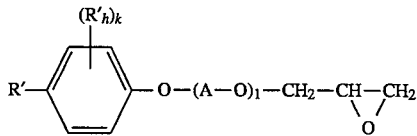

in which

R' and R'$_h$ are, independently of one another, hydrocarbon radicals having from 2 to 25 carbon atoms, with the proviso that the total number of carbon atoms in the glycidyl ether is between 8 and 36, preferably between 10 and 24, k is zero or one, A is a group of the formula CH$_2$CH$_2$, or CH(CH$_3$)CH$_2$, and l is a number from zero to 6, preferably from 1 to 4.

The cellulose ethers partially hydrophobicized by alkylaryl glycidyl ethers include, in particular, hydroxyethylcellulose ethers (HEC) and ethylhydroxyethylcellulose ethers (EHEC) as are described in EP-A-0 384 167, EP-A-0 390 240 and EP-A-0 426 086. Of the alkylaryl glycidyl ethers described therein, preference is given to using C$_{10}$–C$_{24}$-alkylaryl glycidyl ethers, particularly preferably nonylphenyl glycidyl ether, dinonylphenyl glycidyl ether, dodecylphenyl glycidyl ether and also the corresponding ethoxylated or propoxylated compounds thereof.

In the partially hydrophobicized hydroxyethylcellulose ethers (HEC), the molar degrees of substitution MS(EO) are preferably from 1.5 to 3.3 and the average degrees of substitution AS(EO) are preferably from 0.8 to 2.2. In the partially hydrophobicized ethylhydroxyethylcellulose ethers (EHEC), the molar degrees of substitution AS(ethyl) are preferably from 0.5 to 1.5, the molar degrees of substitution MS (EO) are preferably from 0.5 to 2.8 and the average degrees of substitution AS(EO) are preferably from 0.5 to 2.0.

Processes for preparing the cellulose ethers used according to the invention are known to those skilled in the art. The cellulose ethers used according to the invention can be prepared by practically the same methods. The preferred procedure for preparing these cellulose ethers comprises the slurrying of the cellulose ether substrate in an inert organic diluent, for example a lower aliphatic alcohol, ketone or hydrocarbon, and the addition of a solution of an alkali metal hydroxide to the slurry obtained at room temperature. When the cellulose ether substrate is thoroughly wetted and swollen by the alkali, the partial hydrophobicization is carried out by addition of the hydrocarbon radical in the form of a halide, epoxide or glycidyl ether and the reaction is continued to completion. Remaining alkali is then neutralized and the product is isolated, washed with inert diluents and dried.

The components II used are' nonionic surfactants (component IIa), anionic surfactants (component IIb), cationic surfactants (component IIc) or naphthalenesulfonic acid/formaldehyde condensation products (component IId).

The nonionic surfactants possess the formula

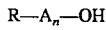

in which

R is C$_8$–C$_{22}$-alkyl, preferably C$_{11}$–C$_{18}$-alkyl, or C$_8$–C$_{22}$-alkenyl, preferably C$_{11}$–C$_{22}$-alkenyl, or C$_8$–C$_{12}$-alkaryl, A is the group OCH$_2$CH$_2$ or OCH(CH$_3$)CH$_2$, and n is a number from 1 to 8, preferably from 2 to 5.

Examples of such surfactants which may be mentioned are the components II 1 to II 5 from the group a, which are shown below on page 15.

The anionic surfactants used as component IIb comprise:

b₁) an ethersulfate, ethersulfonate, ethercarboxylate and/or isethionate of the formula

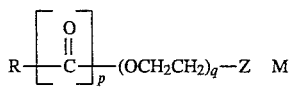

in which

R is $C_8$–$C_{22}$-alkyl, preferably $C_{11}$–$C_{18}$-alkyl, or $C_8$–$C_{22}$-alkenyl, preferably $C_{11}$–$C_{22}$-alkenyl, or $C_8$–$C_{22}$-alkaryl, Z is a group of the formula $OSO_3\ominus$, $SO_3\ominus$ or $OCO_2\ominus$, M is an alkali metal ion or triethanolammonium ion, p is either 0 or 1, and q is a number from 1 to 5, preferably from 2 to 3;

examples of such surfactants of which mention may be made are the components II 7, II 11 and II 13 from group b₁, which are shown below on page 15; or b₂) an olefinsulfonate sodium salt, a primary or secondary alkanesulfonate or a primary or secondary alkylarylsulfonate; examples of surfactants of the group b₂ of which mention may be made are the components II 11 and II 14, which are shown below on page 15; or b₃) a tauride and/or methyltauride of the formula

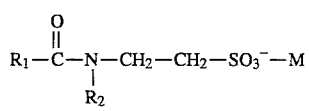

in which $R_1$ is $C_8$–$C_{18}$-alkyl, preferably $C_{11}$–$C_{18}$-alkyl, $C_8$–$C_{18}$-alkenyl, preferably $C_{11}$–$C_{18}$-alkenyl, $R_2$ is hydrogen or methyl, and M is an alkali metal ion or triethanolammonium ion.

An example of surfactants of the group b₃ of which mention may be made is the component II 6, which is shown below on page 15.

The cationic surfactants (component c) possess the formula

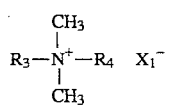

in which $R_3$ is $C_8$–$C_{20}$-alkyl $R_4$ is hydrogen, methyl, benzyl or $C_8$–$C_{20}$-alkyl $X_1^-$ is a halogen ion, acetate ion, lactate ion or methylsulfate ion.

Examples of such surfactants which may be mentioned are the components II 8 and II 9 from group c, which are shown below on page 15.

Furthermore, suitable components II are naphthalenesulfonic acid condensation products (component d). These are generally water-soluble polycondensation products of naphthalenesulfonic acid and formaldehyde in the form of their alkali metal, alkaline earth metal and ammonium salts.

The characteristics of these water-soluble condensation products are shown in the following table.

| Properties | typical data |
|---|---|
| Form supplied | liquid/pulverulent |
| Active content (%) | 20–40/70–96 |
| Sodium sulfate content (%) | 0–25 |
| Molar mass | 4,000–40,000 |
| pH | 6.5–11 |
| Viscosity (23° C.) of the liquid products | 10–150 mPa.s |

The thickener combinations of the invention comprise at least one nonionic cellulose ether (component I) and one or more compounds selected from among the components IIa, IIb₁, IIb₂, IIb₃, IIc or IId.

Preferred thickener combinations comprise mixtures of ethylhydroxyethylcellulose ethers end/or hydroxyethylcellulose ethers (component I) with nonionic surfactants (component IIa) or anionic surfactants (component IIb). Examples of these are shown in the table on pages 16 and 17.

The proportion of the component II in the thickener combinations of the invention is from 0.01 to 99.9% by weight, preferably from 0.05 to 80% by weight, particularly preferably from 0.05 to 60% by weight, based on the total weight of the components I and II. These data are based on the active content of the respective compound of the component II. The sometimes pulverulent or granular compounds of the component II are, depending on the application, either physically dry-mixed or brought directly into solution with the pulverulent cellulose ethers of the component I and subsequently mixed with the respective building product. They can also be directly mixed into the respective building product, in which case the components I and II are either individually mixed in or the components I and II are first mixed with one another and this mixture is then added to the building products. The incorporation of these components I and II into the building products is carried out by conventional stirring and mixing processes.

The sum of the active ingredients of the components I and II of the thickener combination in the building products is from 0.01 to 5% by weight, preferably from 0.02 to 1% by weight, based on the dry mass of the building products.

In the following, the term "building products" means knifing fillers such as plaster knifing fillers, adhesives such as cement tile adhesives, polymer rendering, jointing compositions, machine rendering such as plaster/lime machine rendering and other products of this type. The thickener combinations of the invention are preferably used in building products based on plaster, plaster/lime, lime/cement or cement. A further group of preferred building products are the dispersion paints. To increase the viscosity, these building products can comprise a mixture of the abovementioned thickener combinations comprising methylhydroxyalkyl-, sodium carboxymethyl-, hydroxyethyl-, sodium carboxymethyl- hydroxyethyl- and/or ethylhydroxyethylcellulose ethers.

The thickener combinations of the invention in aqueous medium show a strong thickening effect which was determined in a rotation viscometer at a dissipated energy (shear stress) of $10_2$ and $10_4$ Pa/s at 20° C. By this method, there is observed, depending on the respective composition of the thickener combination, a pronounced pseudoplastic behavior which is likewise transmitted to the liquid paste-like building products.

The improvements in the structural properties in building products are evaluated semiquantitatively in use. They are the increased thickening action, improved processability by utilization of the hydrophilic base properties of the cellulose ethers used according to the invention. The tendency to stick to tools, which is often observed when using high molecular weight cellulose ethers, is reduced. Further advantages are the better and easier divisibility of the building composition. In the experiments, good dissolution of building nodules was found in fast mixing processes. The high low-shear thickening effect correlates with high water retention, even at elevated processing temperatures.

Finally, the thickener combinations of cellulose ethers of the component I end compounds of the component IIe proved to be advantageous in dispersion paints, since high thickening performance, reduced settling of the fillers by high low-shear viscosities and thus reduction in the syneresis phenomena/increased storage stability result. In addition, there results a reduced spattering tendency, i.e. the thickener combination gives more favorable use properties than, for example, an HEC thickener alone.

These are, inter alia, that synergistic thickening effects in aqueous medium are retained, for example, in the low shear range and that nevertheless the viscoelastic properties, mainly, arising from the molecular weight of the cellulose ether of the component I in question, can be positively utilized in the high shear range, i.e., for example, the processing phase of a dispersion paint or a knifing filler. Also included are additional effects arising from the organic surfactant component.

EXAMPLES

The following products were used as water-soluble, nonionic cellulose ethers (component I):

| Sample designation | Cellulose ether | Viscosity (mPa.s) of the 1% strength aqueous solution at 20° C. and 100 Pa/s | Average degree of substitution/ AS(OCH$_3$) | molar degree of substitution/MS (EO) |
|---|---|---|---|---|
| A | "MHEC 10$^4$"* | 410 | 1.5 | 0.11 |
| B | "HEC 10$^4$"* | 340 | — | 2.3 |
| C | macro-surfactant C**) HEC | 370 | hydrophobicization hydrophobically modified by alkyl groups according to DE-A-3 004 161 | |
| D | macro-surfactant D***) EHEC | 380 | hydrophobically modified according to EP-A-030 240 | |
| E | macro-surfactant E****) HEC | 1240 | hydrophobically modified by alkylaryl glycidyl ether according to EP-A-0 384 167 | |

The samples A and B are comparative samples.
*Note: The designator 10$^4$ indicates that the 2% strength aqueous solution of the cellulose ether in question possesses a viscosity of 10,000 [mPa.s], measured with the Höppler falling sphere viscometer.
The samples C, D and E are cellulose ethers used according to the invention.

**)® Natrosol Plus C (Aqualon Company)
***)® Bermoocoll EH M 100 (Berol Nobel Stanungsund AB)
****)® Callosize Spatterguard 100 (Union Carbide Chemicals and Plastics Company, Inc.)

Characteristics of the components II used (see also examples)

| Component II | Group | Description |
|---|---|---|
| 1 | a | i-C$_{13}$-alcohol + 3 mol of EO |
| 2 | a | i-C$_{13}$-alcohol + 6 mol of EO |
| 3 | a | nonylphenol + 6 mol of EO |
| 4 | a | tributylphenol + 6 mol of EO |
| 5 | a | C$_{14/15}$-oxoalcohol + 4 mol of EO |
| 6 | b$_3$ | oleyl methyltauride |
| 7 | b$_1$ | alkyl ether carboxylate |
| 8 | c | (C$_{10}$H$_{22}$)$_2$(CH$_3$)$_2$NCl |
| 9 | c | (C$_{18}$H$_{37}$)$_2$(CH$_3$)$_2$NCl |
| 10 | a | C$_{11}$-oxoalcohol + 3 mol of EO |
| 11 | b$_2$ | secondary alkanesulfonate sodium salt |
| 12 | b$_1$ | C$_{12}$/C$_{14}$ alkyl diglycol ether-sulfate sodium salt |
| 13 | b$_1$ | C$_{12}$/C$_{14}$ alkyl triglycol ether-sulfate sodium salt |
| 14 | b$_2$ | C$_{14}$/C$_{16}$-α-olefinsulfonate sodium salt |
| 15 | d | naphthalenesulfonic acid/formaldehyde condensation product |
| 16 | d | naphthalenesulfonic acid/formaldehyde condensation product |

15 Examples of thickener combinations

| Example | Component I | Component II | Viscosity (mPa.s) |
|---|---|---|---|
| 1 | Sample C | — | 370 |
| 2 | Sample C | 1 | 1110 |
| 3 | Sample C | 2 | 745 |
| 4 | Sample C | 3 | 650 |
| 5 | Sample C | 4 | 625 |
| 6 | Sample C | 5 | 1840 |
| 7 | Sample C | 6 | 1430 |
| 8 | Sample C | 7 | 580 |
| 9 | Sample C | 8 | 680 |
| 10 | Sample C | 9 | 790 |
| 11 | Sample C | 10 | 1150 |
| 12 | Sample C | 11 | 1300 |
| 13 | Sample C | 12 | 3000 |
| 14 | Sample C | 13 | 1740 |
| 15 | Sample C | 14 | 2100 |
| 16 | Sample C | 15 | 1870 |
| 17 | Sample C | 16 | >10,000 |
| 18 | Sample D | — | 410 |
| 19 | Sample D | 1 | 540 |
| 20 | Sample D | 6 | 870 |
| 21 | Sample D | 12 | 3980 |
| 22 | Sample D | 13 | 840 |
| 23 | Sample D | 14 | 540 |
| 24 | Sample D | 15 | 890 |
| 25 | Sample D | 16 | 1550 |
| 26 | Sample E | — | 1230 |
| 27 | Sample E | 1 | 1360 |
| 28 | Sample E | 3 | 1260 |
| 29 | Sample E | 5 | 1990 |
| 30 | Sample E | 9 | 1550 |

The viscosity is measured at 10$_2$ Pa/s, 20° C. in 1% strength aqueous solution. The weight ratio of component I: component II is 10:1.

The preparation of the dispersion paints is carried out according to the recipes 1 and 2 below. To follow the active effect as regards the spattering tendency, smaller amounts of thickener combination were deliberately used here. The spattering and splashing behavior was examined using a mechanized laboratory testing machine in which the paint roller loaded with a defined amount of paint is passed horizontally over a paint wiping mesh at a defined speed and contact pressure and the paint spatters are collected on a black piece of cardboard located further below.

Number and size of spatter particles are assessed semi-quantitatively.

| Recipe 1 Dispersion paints (data in parts by weight) | | | | |
|---|---|---|---|---|
| | Example | | | |
| | 1 | 2 | 3 | 4 |
| Water | 170.5 | 170.5 | 170.5 | 170.5 |
| Preservative | 1 | 1 | 1 | 1 |
| Dispersant | 10 | 10 | 10 | 10 |
| Sample C | 1.7 | 1.7 | 1.7 | 1.7 |
| Comp. II 0.17 part by weight | — | 16 | 15 | 6 |
| $TiO_2$ | 37.5 | 37.5 | 37.5 | 37.5 |
| Fillers | 237.5 | 237.5 | 237.5 | 237.5 |
| NaOH/10% strength | 0.5 | 0.5 | 0.5 | 0.5 |
| Styrene-acrylate dispersion*** | 45 | 45 | 45 | 45 |
| Film former | 2 | 2 | 2 | 2 |
| Viscosity (mPa.s)*) | 4500 (1100) | 3000 (1100) | 3500 (900) | 3000 (800) |
| Evaluation**) | 7 | 5 | 5 | 6 |

*) Brookfield viscometer, spindle 6 at 10 and 100 rpm (figure in brackets)
**) relative classification: no ("1") ... ("10") strong spattering/splashing
***) Mowilith DM 611 (Hoechst AG)

| Recipe 2 Dispersion paints (data in parts by weight) | | | | | |
|---|---|---|---|---|---|
| | Example | | | | |
| | 5 | 6 | 7 | 8 | 9 |
| Water | 170.5 | 170.5 | 170.5 | 170.5 | 170.5 |
| Preservative | 1 | 1 | 1 | 1 | 1 |
| Dispersant | 10 | 10 | 10 | 10 | 10 |
| Sample C | 1.7 | 1.7 | 1.7 | 1.7 | 1.7 |
| Comp. II 0.17 parts by weight | — | 16 | 15 | 14 | 6 |
| $TiO_2$ | 37.5 | 37.5 | 37.5 | 37.5 | 37.5 |
| Fillers | 237.5 | 237.5 | 237.5 | 237.5 | 237.5 |
| NaOH/10% strength | 0.5 | 0.5 | 0.5 | 0.5 | 0.5 |
| Ethylene-vinyl acetate copolymer*** | 45 | 45 | 45 | 45 | 45 |
| Viscosity (mPa.s)*) | 2000 (600) | 2500 (850) | 3000 (950) | 3000 (850) | 2500 (700) |
| Evaluation**) | 3 | 2 | 2 | 3 | 2 |

*) Brookfield viscometer, spindle 6 at 10 and 100 rpm (figure in brackets). Dispersion paint conditioned for 1 day at 23° C.
**) relative classification: no ("1") ... ("10") strong spattering/splashing
***) Mowilith DM 1290 (Hoechst AG)

Examples of a synergistic mode of action of the thickener combination in a knifing filler building product

| Recipe 3: Thickener combination in knifing fillers (data in parts by weight) | | | | | |
|---|---|---|---|---|---|
| | Example | | | | |
| | 10 | 11 | 12 | 13 | 14 |
| Modeling plaster*) | 200.0 | 200.0 | 200.0 | 200.0 | 200.0 |
| Retardant**) | 0.2 | 0.2 | 0.2 | 0.2 | 0.2 |
| Sample C | 1.0 | 0.9 | 0.9 | 0.9 | 0.9 |
| Comp. II addition as 0.1 part by weight | — | 6 | 14 | 15 | 16 |
| Water | 94 | 94 | 94 | 94 | 94 |
| Assessment | | | | | |
| Thickening effect | very weak without thickening peak | very strong pronounced | weak, similar to Experiment No. 10 | weak, similar to Experiment No. 10 | weak similar to Experiment No. 10 |
| Lump formation+) | little | none | none | none | none |
| Structure++) | 2 | 1+ | 3 | 4 | 4 |

*)β-hemihydrate plaster, finely ground
**)Zeliquid GA (Hoechst AG)
+)mixing time 1 minute, manual
++)marking system: 1 = very good, 6 = unsatisfactory The plaster knifing filler prepared according to Example 11 shows a strong (desired) thickening effect, rapid dissolution of lumps within short mixing times and very good structural consistency/plasticity.

Examples of a synergistic mode of action of the thickener combination in a plaster/lime machine rendering as building product

| Recipe 4: Thickener combination in plaster/lime machine rendering (data in parts by weight) | | | | | | |
|---|---|---|---|---|---|---|
| | Example | | | | | |
| | 15 | 16 | 17 | 18 | 19 | 20 |
| P/L MR base mixture*) | 200 | 200 | 200 | 200 | 200 | 200 |
| Sample C | 0.4 | 0.36 | 0.36 | 0.36 | 0.36 | 0.36 |
| Comp. II, addition as 0.04 part by weight | — | 6 | 14 | 15 | 16 | 1 |
| Water | 72 | 72 | 72 | 72 | 72 | 72 |
| Assessment | | | | | | |
| Thickening effect | weak in about 8 sec. | weak in 8–01 sec. | weak in 8–10 sec. | strong 8 sec. | strong 8–10 sec. | intermed. 8–10 sec. |
| Lump formation+) | some | some | some | few | few | few |
| Structure++) | 3 | 1 | 2 | 1 | 2 | 2- |

*)about 40 parts by weight of plaster 7 parts by weight of slaked lime remainder: lime/sand brick -continued

| Recipe 4: Thickener combination in plaster/lime machine rendering (data in parts by weight) | | | | | |
|---|---|---|---|---|---|
| | Example | | | | |
| 15 | 16 | 17 | 18 | 19 | 20 |

+) stirring time only 20 seconds, manual
++) marking system: 1 = very good; 6 = unsatisfactory The plaster/lime machine renderings of Examples 16 and 18 have a favorable structure. Examples 18 and 19 show strong thickening effects with a short stirring time.

Examples of a synergistic mode of action of the thickener combination in a building product (cement tile adhesive)

| Recipe 5: Thickener combination in the cement tile adhesive (data in parts by weight) | | | | | |
|---|---|---|---|---|---|
| | Example | | | | |
| | 21 | 22 | 23 | 24 | 25 |
| Tile adhesive base mixture*) | 300 | 300 | 300 | 300 | 300 |
| Sample C | 1.5 | 1.35 | 1.35 | 1.35 | 1.35 |
| Comp. II addition 0.15 part by weight | — | 6 | 14 | 15 | 16 |
| Water | 66 | 66 | 66 | 66 | 66 |
| Assessment | | | | | |
| Thickening effect | somewhat stronger than Exp. No. 21 | similar to Exp. No. 21 | very strong thickening effect | very strong thickening effect | |
| Structure++) | 4 | 4 | 3 | 1 | 1 |

*) 40 parts by weight of cement PZ 45 F
*) 60 parts by weight of sand of diverse grain size
**) marking system: 1 = very good, 6 = unsatisfactory The thickener combinations of Examples 24 and 25 have very strong thickening effects.

Examples of a synergistic mode of action of the thickener combination in a building product (plaster/lime machine rendering)

Assessment of the temperature-dependent water retention in plaster/lime machine rendering in accordance with DIN 18 555 at 20° C. and 40° C. (data in parts by weight)

| | Examples | | | |
|---|---|---|---|---|
| | 26 | 27 | 28 | 29 |
| Plaster/lime base mixture | 1000 | 1000 | 1000 | 1000 |
| Sample C | 2 | 2 | 2 | 2 |
| Comp. II (No. 6) | — | 0.2 | — | 0.2 |
| Water | 360 | 260 | 260 | 360 |
| Assessment | | | | |
| Water retention in (%) | at 20° C. 97.95 | at 20° C. 98.30 | at 40° C. 97.31 | at 40° C. 97.64 |

High water retentions are achieved with the cellulose ether and the thickener combination, with reduced proportion of cellulose ether, because of the low water factor and the favorable structure. They are comparable in the temperature range investigated, i.e. independent of the processing temperature.

We claim:

1. A thickener composition for building products comprising:

a component I), comprising at least one nonionic cellulose ether soluble in water or aqueous surfactant solutions, wherein the cellulose ether is substituted by at least one hydrocarbon radical having from 8 to 36 carbon atoms, and a component II), comprising from 0.05 to 10% by weight, based on the total weight of component I and component II, of one of the following surfactant components a) at least one nonionic surfactant of the formula $$R-A_n-OH$$

in which

R is $C_8$–$C_{22}$-alkyenyl, $C_8$–$C_{22}$-alkaryl or $C_2$–$C_{12}$-alkaryl,

A is the group $OCH_2CH_2$ or $OCH(CH_3)CH_2$, and

N is a number from 1 to 8, b) at least one ethersulfate, ethersulfonate, ethercarboxylate, iseothionate, or mixtures thereof of the formula $$R\!\!\left[\!\!\begin{array}{c}O\\ \|\\ -C-\end{array}\!\!\right]_p\!\!(OCH_2CH_2)_q-Z\quad M$$

in which

R is $C_8$–$C_{22}$-alkyl, $C_8$–$C_{22}$-alkenyl or $C_2$–$C_{12}$-alkaryl,

Z is a group of the formula $OSO_3^{\ominus}$, $SO_3^{\ominus}$, or $OCO_2^{\ominus}$, M is an alkali metal ion or triethanolammonium ion, p is either 0 or 1, and q is a number from 1 to 5, c) at least one olefinsulfonate sodium salt, a primary or secondary alkanesulfonate, or a primary or secondary alkarylsulfonate, d) at least one tauride, methyltauride, or mixtures thereof of the formula $$R_1-\overset{O}{\overset{\|}{C}}-\underset{\underset{R_2}{|}}{N}-CH_2-CH_2-SO_3^-\quad M$$

in which $R_1$ is $C_8$–$C_{18}$-alkyl or $C_8$–$C_{18}$-alkenyl, $R_2$ is hydrogen or methyl, and M is an alkali metal ion or triethanolammonium ion, d) at least one cationic surfactant of the formula

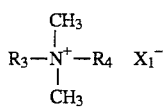

in which

R₃ is $C_8$–$C_{20}$-alkyl,

R₄ is hydrogen, methyl, benzyl, or $C_8$–$C_{20}$-alkyl, and $X_1^-$ is a halide ion, acetate ion, lactate ion, or methylsulfate ion, or e) at least one naphthalenesulfonic acid/formaldehyde condensation product.

2. A thickener composition as claimed in claim 1, wherein in the nonionic surfactant of the formula

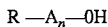

R is $C_{11}$–$C_{18}$-alkyl, $C_{11}$–$C_{22}$-alkenyl and n is a number from 2 to 5, in the ethersulfate, ethersulfonate, ethercarboxylate and/or isethionate of the formula

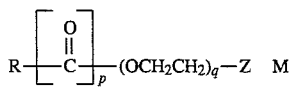

R is $C_{11}$–$C_{18}$-alkyl or $C_{11}$–$C_{22}$-alkenyl, and q is a number from 2 to 3, in the tauride and/or methyltauride of the formula

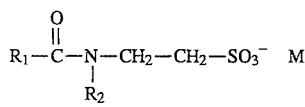

R₁ is $C_{11}$–$C_{18}$-alkyl or $C_{11}$–$C_{18}$-alkenyl.

3. A thickener composition as claimed in claim 1, wherein the component I cellulose ethers used are nonionic cellulose ethers soluble to at least 1% by weight in water at 20° C.

4. A thickener composition as claimed in claim 1, wherein the cellulose ether possesses a methyl, hydroxyethyl, hydroxypropyl or hydroxyethyl substitution and a further substitution by at least one hydrocarbon radical having from 8 to 36 carbon atoms in an amount between 0.2% by weight and 5% by weight, based on the cellulose ether.

5. A thickener composition as claimed in claim 4, wherein the cellulose ether possesses a hydroxyethyl or ethylhydroxyethyl substitution.

6. A thickener composition as claimed in claim 1, wherein the further substituents of the cellulose ether are $C_8$–$C_{36}$-alkyl halides, $C_8$–$C_{36}$-alkylaryl halides, $C_8$–$C_{36}$-alkyl epoxides, $C_8$–$C_{36}$-alkylaryl glycidyl ethers or $C_8$–$C_{36}$-alkyl glycidyl ethers.

7. A thickener composition as claimed in claim 1, wherein the cellulose ethers used are hydroxyethylcellulose ethers having a molar degree of substitution MS(EO) of from 1.5 to 3.3 and an average degree of substitution AS(E-O) of from 0.8 to 2.2.

8. A thickener composition as claimed in claim 1, wherein the cellulose ethers used are ethylhydroxyethylcellulose ethers having a molar degree of substitution AS(ethyl) of from 0.5 to 1.5, a molar degree of substitution MS(EO) of from 0.5 to 2.8 and an average degree of substitution AS(EO) of from 0.5 to 2.0.

9. A thickener composition as claimed in claim 1, wherein the cellulose ethers of component I possess an average molecular weight ($\overline{M}_w$) of from 10,000 to 500,000.

10. A thickener composition as claimed in claim 1, which comprises a mixture of hydroxyethylcellulose ethers and/or ethylhydroxyethylcellulose ethers as component I with nonionic surfactants as component IIa or anionic surfactants as component IIb.

11. A thickener composition consisting essentially of:

a component I), consisting essentially of at least one nonionic cellulose ether soluble in water or aqueous surfactant solutions, wherein the cellulose ether is substituted by at least one hydrocarbon radical having from 8 to 36 carbon atoms, and a component II), consisting essentially of from 0.05 to by weight, based on the total weight of component I and component II, of one of the following surfactant components a) at least one nonionic surfactant of the formula

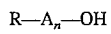

in which

R is $C_8$–$C_{22}$-alkyl, $C_8$–$C_{22}$-alkenyl or $C_2$–$C_{12}$-alkaryl,

A is the group $OCH_2CH_2$ or $OCH(CH_3)CH_2$, and

N is a number from 1 to 8, b) at least one ethersulfate, ethersulfonate, ethercarboxylate, isothionate, or mixtures thereof of the formula

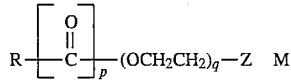

in which

R is $C_8$–$C_{22}$-alkyl, $C_8$–$C_{22}$-alkenyl or $C_2$–$C_{12}$-alkaryl,

Z is a group of the formula $OSO_3^{\ominus}$, $SO_3^{\ominus}$, or $OCO_2^{\ominus}$, M is an alkali metal ion or triethanolammonium ion, p is either 0 or 1, and q is a number from 1 to 5, c) at least one olefinsulfonate sodium salt, a primary or secondary alkanesulfonate, or a primary or secondary alkarylsulfonate, d) at least one tauride, methyltauride, or mixtures thereof of the formula

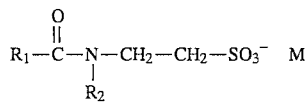

in which

R₁ is $C_8$–$C_{18}$-alkyl or $C_8$–$C_{18}$-alkenyl,

R₂ is hydrogen or methyl, and

M is an alkali metal ion or triethanolammonium ion, d) at least one cationic surfactant of the formula

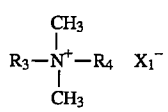
in which
R₃ is $C_8$–$C_{20}$-alkyl,
R₄ is hydrogen, methyl, benzyl, or $C_8$–$C_{20}$-alkyl, and
  $X_8^-$ is a halide ion, acetate ion, lactate ion, or methylsulfate ion, or
e) at least one naphthalenesulfonic acid/formaldehyde condensation product.
* * * * *